United States Patent
Royer

(10) Patent No.: US 10,415,700 B2
(45) Date of Patent: Sep. 17, 2019

(54) COLUMN SHIFTER PARK LOCK AND PARK DETECT SWITCH MECHANISM

(71) Applicants: THYSSENKRUPP PRESTA AG, Eschen (LI); THYSSENKRUPP AG, Essen (DE)

(72) Inventor: Donald Royer, Indianapolis, IN (US)

(73) Assignee: thyssenkrupp AG, Essen (DE)

( * ) Notice: Subject to any disclaimer, the term of this patent is extended or adjusted under 35 U.S.C. 154(b) by 360 days.

(21) Appl. No.: 15/426,615

(22) Filed: Feb. 7, 2017

(65) Prior Publication Data

US 2018/0223991 A1    Aug. 9, 2018

(51) Int. Cl.
| F16H 61/22 | (2006.01) |
| F16H 59/10 | (2006.01) |
| B60K 20/06 | (2006.01) |

(52) U.S. Cl.
CPC ........... *F16H 61/22* (2013.01); *F16H 59/105* (2013.01); *B60K 20/06* (2013.01)

(58) Field of Classification Search
CPC ................................. B60K 20/06; F16H 61/22
See application file for complete search history.

(56) References Cited

U.S. PATENT DOCUMENTS

| 4,733,573 A * | 3/1988 | Kramer | B60K 20/06 74/107 |
| 5,759,132 A | 6/1998 | Osborn et al. | |
| 5,853,348 A | 12/1998 | Lehman | |
| 6,082,216 A | 7/2000 | Watanabe et al. | |
| 6,592,492 B1 * | 7/2003 | Kalia | B60R 25/02144 477/96 |
| 7,845,252 B2 * | 12/2010 | Vermeersch | F16H 61/26 74/473.27 |
| 8,113,081 B2 * | 2/2012 | Reppuhn | F16H 59/10 74/473.15 |
| 8,197,387 B2 | 6/2012 | Vermeersch et al. | |
| 8,366,149 B2 | 2/2013 | Huber | |
| 8,991,863 B2 | 3/2015 | Hahn et al. | |
| 9,090,284 B2 | 7/2015 | Meyer et al. | |
| 2003/0195082 A1 | 10/2003 | Kalia | |
| 2003/0205100 A1 * | 11/2003 | Vermeersch | B60R 25/02144 74/473.32 |
| 2003/0213673 A1 | 11/2003 | Burr et al. | |
| 2005/0236252 A1 * | 10/2005 | Vermeersch | F16H 61/22 192/220.2 |
| 2015/0314801 A1 | 11/2015 | Hausknecht et al. | |
| 2018/0223990 A1 * | 8/2018 | Shogren | F16H 61/22 |

FOREIGN PATENT DOCUMENTS

EP    0437985 B1    8/1994

* cited by examiner

*Primary Examiner* — Terence Boes
(74) *Attorney, Agent, or Firm* — RMCK Law Group PLC

(57) ABSTRACT

A shifter system assembly for a steering column includes a shifter mechanism, a cam assembly, a solenoid and a park lock assembly. The shifter mechanism receives a shift lever and has a shaft that rotates upon movement of the shift lever. The cam assembly includes a cam actuator lever that defines a first engagement feature and is configured to rotate upon rotation of the shaft. The solenoid moves a pin between an extended and retracted position based on the shifter mechanism being in a "Park" position or out of the "Park" position. The park lock assembly moves between a locked position and an unlocked position. In the locked position rotation of the cam actuation lever is precluded. In the unlocked position rotation of the cam actuator lever is permitted.

18 Claims, 5 Drawing Sheets

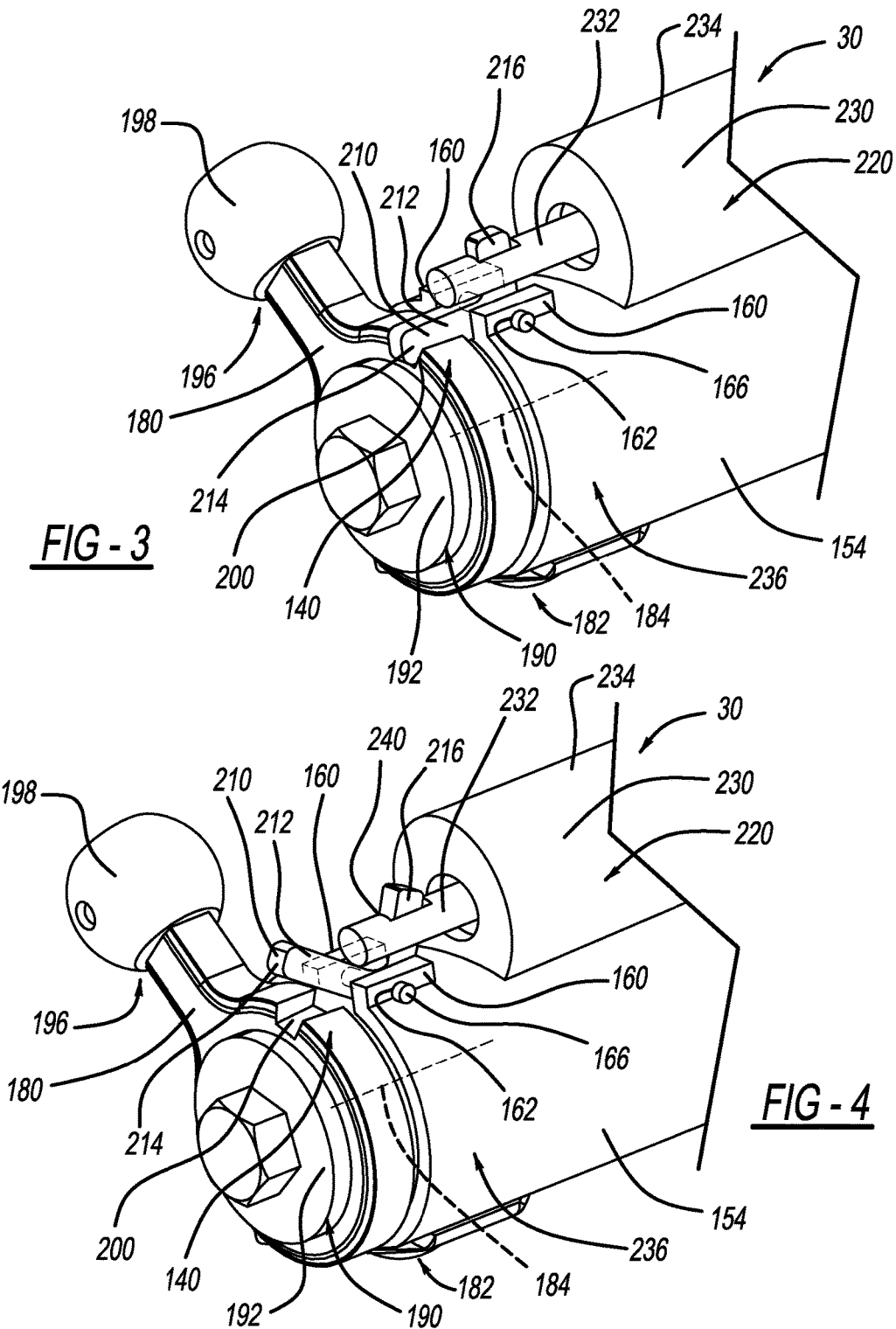

COLUMN SHIFTER PARK LOCK AND PARK DETECT SWITCH MECHANISM

FIELD

The present disclosure relates generally to a steering column shifter having a park lock mechanism and park detect switch.

BACKGROUND

Motor vehicles having automatic transmissions typically include shifter levers mounted on a steering column or on a center console. Shifter levers are generally provided as part of a steering column assembly that further includes a brake transmission shift interface (BTSI) feature. In general, the BTSI feature precludes an operator from moving the shift lever out of a park position unless an ignition switch is in an "ON" position and a brake pedal is depressed. Many steering column assemblies further include a park lock feature that precludes movement of the shift lever from the park position unless an ignition switch is in the "ON" position.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A shifter system assembly for a steering column constructed in accordance to one example of the present disclosure includes a shifter mechanism, a cam assembly, a solenoid and a park lock assembly. The shifter mechanism receives a shift lever and has a shaft that rotates upon movement of the shift lever. The cam assembly includes a cam actuator lever and a cam receiver. The cam actuator lever defines a first engagement feature and is configured to rotate upon rotation of the shaft. The solenoid moves a pin between an extended and retracted position based on the shifter mechanism being in a "Park" position or out of the "Park" position. The park lock assembly moves between a locked position and an unlocked position. In the locked position the pin locates into an engaged position with the first engagement feature and precludes rotation of the cam actuation lever. In the unlocked position the pin locates into a disengaged position relative to the first engagement feature permitting rotation of the cam actuator lever.

According to other features, the shifter system includes a park detect switch having a first state corresponding to the shifter mechanism being in the "Park" position and a second state corresponding to the shifter mechanism being out of the "Park" position. In the first state a key is permitted to be removed from an ignition switch. In the second state the key is precluded from being removed from the ignition switch. Switching between the first state and the second state is dependent upon movement of the pin between the extended and retracted positions. In one arrangement, the first state is an open state and the second state is a closed state. The park detect switch includes a first electrical contact portion and a second electrical contact portion. The first and second electrical contact portions electrically contact each other in the closed state. The first electrical portion comprises an insulated pin extension portion and a conductive disc contact. The insulated pin extension portion is fixed for translation with the pin.

According to other features of the instant disclosure, the first engagement feature is a slot defined in the cam actuation lever. A solenoid housing houses the solenoid. The solenoid housing is located at the lever end of the stationary housing proximate to the cam actuating lever.

A shifter system assembly for a steering column constructed in accordance to another example of the present disclosure includes a stationary housing, a shifter mechanism, a cam actuator lever, a solenoid housing, a solenoid and a park lock assembly. The shifter mechanism is rotatably coupled to the stationary housing and receives a shift lever. The shifter mechanism has a shaft that rotates within the stationary housing upon movement of the shift lever. The cam actuator lever is disposed on a lever end of the stationary housing for concurrent rotation with the shaft. The cam actuation lever defies a first engagement feature. The solenoid housing is disposed at the lever end of the stationary housing. The solenoid is received in the solenoid housing and moves a pin between an extended and retracted position based on the shifter mechanism being in a "Park" position or out of the "Park" position. The park lock assembly includes a second engagement feature that moves based on movement of the pin. The park lock assembly moves between a locked position and an unlocked position. In the locked position the second engagement feature locates into an engaged position with the first engagement feature and precludes rotation of the cam actuation lever. In the unlocked position the second engagement feature locates into a disengaged position relative to the first engagement feature permitting rotation of the cam actuator lever.

According to other features, the shifter system includes a park detect switch having a first state corresponding to the shifter mechanism being in the "Park" position and a second state corresponding to the shifter mechanism being out of the "Park" position. In the first state a key is permitted to be removed from an ignition switch. In the second state the key is precluded from being removed from the ignition switch. Switching between the first state and the second state is dependent upon movement of the pin between the extended and retracted positions. In one arrangement, the first state is an open state and the second state is a closed state. The park detect switch includes a first electrical contact portion and a second electrical contact portion. The first and second electrical contact portions electrically contact each other in the closed state. The first electrical portion comprises an insulated pin extension portion and a conductive disc contact. The insulated pin extension portion is fixed for translation with the pin.

According to other features of the instant disclosure the first engagement feature is a slot defined in the cam actuation lever. The second engagement feature is a pawl that selectively locates into the slot. The pawl includes a pawl body having a first end and a second end that extend relative to each other substantially at an angle between 80° and 110°, and preferably a right angle. The pawl is pivotally coupled to a stationary housing that is fixed relative to the steering column.

In other features, the shifter system can include a dual contact park detect switch having a park confirmation contact assembly and a key removal contact assembly. The park confirmation contact assembly has first and second park confirmation contacts that move between open and closed positions. The closed position defining a first connection. The key removal contact assembly has first and second key removal contacts that move between open and closed positions. The closed position defining a second connection. The dual contact park detect switch can be a brake before make switch or a make before break switch. A key is permitted to be removed from an ignition subsequent to sequential closing of the first and second connections.

BRIEF DESCRIPTION OF THE DRAWINGS

The present disclosure will become more fully understood from the detailed description and the accompanying drawings, wherein:

FIG. 3 is a partial perspective view of shifter assembly having a park detect switch assembly constructed in accordance to one example of the present disclosure and shown in an open position corresponding to the vehicle being in a "Park" position;

FIG. 4 is a partial perspective view of the shifter assembly of FIG. 3 and shown in a closed position corresponding to the vehicle being out of the "Park" position;

DETAILED DESCRIPTION

Figure 1:
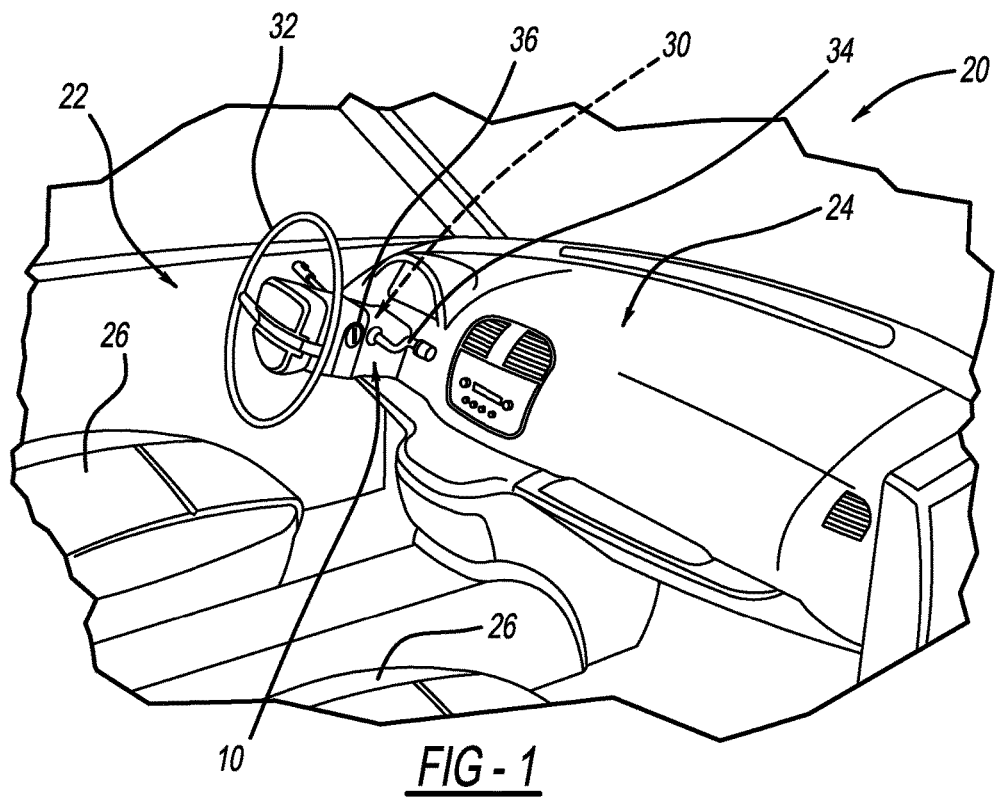
FIG. 1 is partial perspective view of an exemplary vehicle cabin having a steering column assembly constructed in accordance to one example of the present disclosure.

With initial reference to FIG. 1, a steering column assembly constructed in accordance to one example of the present teachings is shown and generally identified at reference numeral 10. The steering column assembly 10 is shown in an exemplary vehicle 20 having a vehicle cabin 22 that includes a dash 24 and vehicle seats 26. The steering column assembly 10 includes a shifter system assembly 30 explained in greater detail herein. The steering column assembly 10 supports a steering wheel 32 and further includes a shift lever 34 and an ignition switch 36. For purposes of the following discussion, the shift lever 34 can be moved to select a number of operating positions including, but not limited to, "Park", "Reverse", "Neutral", "Drive", "Second" and "First" positions. An ignition key can be inserted into the ignition switch 36. The ignition switch can be rotated to a number of positions including, but not limited to, "Accessory", "Lock", "Off", "Run" and "Start" positions. As is conventional, the ignition key is permitted to be inserted into and removed from the ignition switch 36 when the ignition switch 36 is in the "Lock" position. It is appreciated that the configuration of the vehicle 20 shown in FIG. 1 including the shift lever 34 and ignition switch 36 is merely exemplary. In this regard, the steering column assembly 10 may be incorporated as part of other vehicle arrangements and models having different styles within the scope of the present disclosure.

Figure 2:
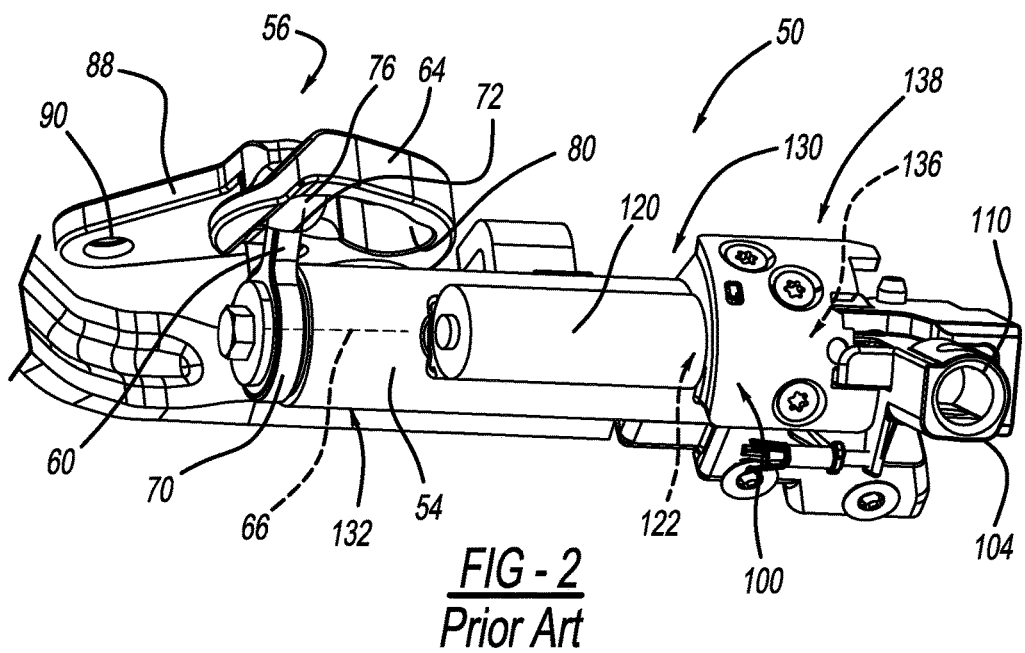
FIG. 2 perspective view of a shifter assembly constructed in accordance to one example of Prior Art.

Turning now to FIG. 2, a shifter system assembly 50 constructed in accordance to one example of prior art will be described. The shifter system assembly 50 includes a stationary housing 54 that can be fixedly mounted to the vehicle within a steering column assembly. The shifter system assembly 50 includes a cam assembly 56 including a cam actuator lever 60 and a cam receiver 64. The cam actuator lever 60 is rotated by a shaft 66 disposed within the stationary housing 54. The cam actuator lever 60 has a proximal end 70 that is configured to be mounted to the shaft 66 and a distal end 72 that supports a ball 76. The cam receiver 64 defines an arcuate slot 80 that receives the ball 76. The cam receiver 64 can include a crank member 88. The crank member 88 can include a mounting point 90 configured to receive a mechanical push-pull cable that connects the crank member 88 to the transmission.

The housing 54 supports a brake transmission shift interlock (BTSI) system 100 and a shifter mechanism 104. The shifter mechanism 104 is connected to the shaft 66 and has a socket 110 that receives a shift lever (such as shift lever 34, FIG. 1). In this regard, rotation of the shifter mechanism 104 causes rotation of the shaft 66 ultimately causing movement of the crank member 88 from interaction of the cam assembly 56.

The BTSI system 100 precludes an operator from moving the shift lever out of a "Park" position unless an ignition switch is in an "ON" position and a brake pedal is depressed. The BTSI system 100 includes a solenoid 120 that moves an armature or pin 122 between extended and retracted positions to selectively preclude and permit movement of the shift lever out of "Park". The BTSI solenoid 120 is located generally on a first end 130 of the housing 54 proximate to the shifter mechanism 104. The cam actuation lever 60 is located generally on a second end 132 of the housing 54. A park detect switch (PDS) 136 detects when the shifter mechanism 104 is in the "Park" position. When the shifter mechanism 104 is in the "Park" position, the solenoid 120 is de-energized so that the key can be removed from the ignition switch. The PDS 136 is located on the first end 130 of the housing 54 near the shifter mechanism 104.

In the Prior Art example, the BTSI system 100 including the pin 122 is located at the first end 130 of the housing 54 and occupies a shared space 138 with the shifter mechanism 104. The mechanical complexity of all of the components in the shared space 138 makes it challenging to manage component tolerance stacks for the shifter system assembly 50 while meeting customer performance requirements for the park lock function.

Turning now to FIGS. 3 and 4, the shifter system assembly 30 according to the present disclosure will be further described. The shifter system assembly 30 includes a park lock assembly 140 and a park detect switch (PDS) 142. As will become appreciated, the park lock function of the shifter system assembly 30 is moved to the opposite end of the housing (compared to the Prior Art example in FIG. 2) where fewer components are located simplifying the design and improving robustness for many system components. It will further be appreciated that unless otherwise described herein, the shifter system assembly 30 includes similar components as the shifter system assembly 50 described above. The shifter system assembly 30 includes a stationary housing 154 that can be fixedly mounted to the vehicle within a steering column assembly 10. The stationary housing 154 includes outwardly extending tabs 160 having respective apertures 162 that receive a pawl pin 166.

A cam actuation lever 180 is positioned at a lever end 182 of the stationary housing 154. The lever end 182 corresponds to the second end 132 of the housing 54 described above with respect to Prior Art. The cam actuation lever 180 is rotated by a shaft 184 disposed within the stationary housing 154. The cam actuation lever 180 has a proximal end 190 that is keyed to a collar 192 that rotates with the shaft 184. The cam actuation lever 180 includes a distal end 196 that supports a ball 198. The ball 198 is configured to be received by a cam receiver, such as the cam receiver 64 described above. The proximal end 190 defines a first engagement feature or slot 200. Rotation of a shifter mechanism (see shifter mechanism 104, FIG. 2) causes rotation of the shaft 184 ultimately causing movement of a crank member (see crank member 88, FIG. 2) from interaction of the cam actuation lever 180 with a cam receiver (see cam receiver 64, FIG. 2).

A second engagement feature or pawl 210 is rotatably mounted to the housing 154 about the pawl pin 166. The pawl 210 has a pawl body 212 that includes a first end 214 and a second end 216. In the example shown, the first and second ends 214 and 216 extend at a right angle however other angles are contemplated. In a preferred embodiment, the pawl body 212 can comprise a soft material such as a rubber or a resin. The soft material can be arranged in a contact area between the pawl body 212 and the slot 200. The soft material damps noise in the locked position and during a change between locked and unlocked positions.

Figure 5:
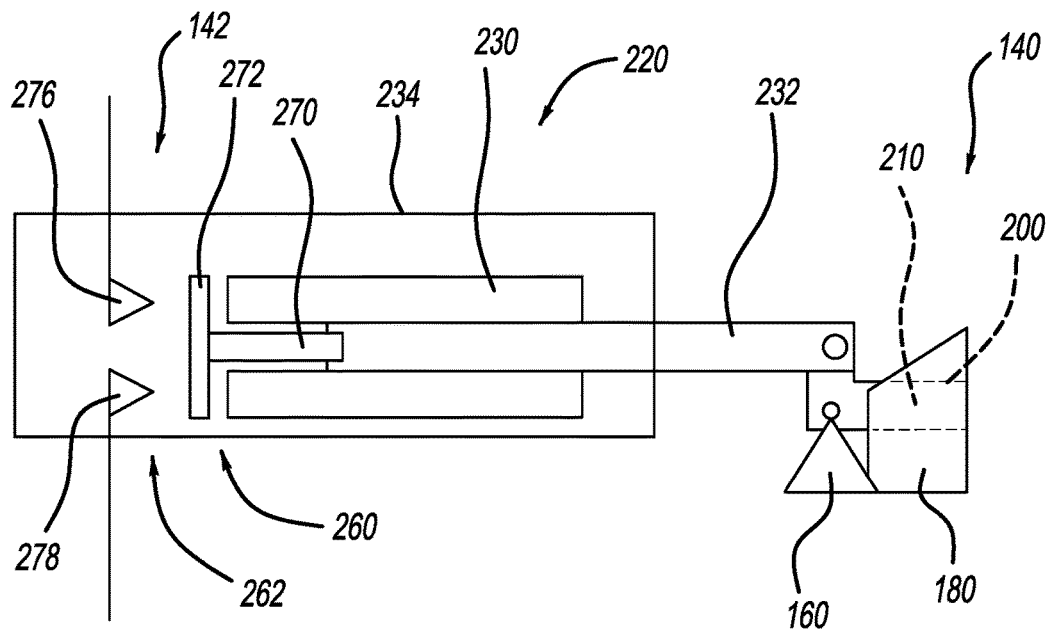
FIG. 5 is a schematic illustration of the park detect switch assembly of FIG. 3 in the "Park" position.
Figure 6:
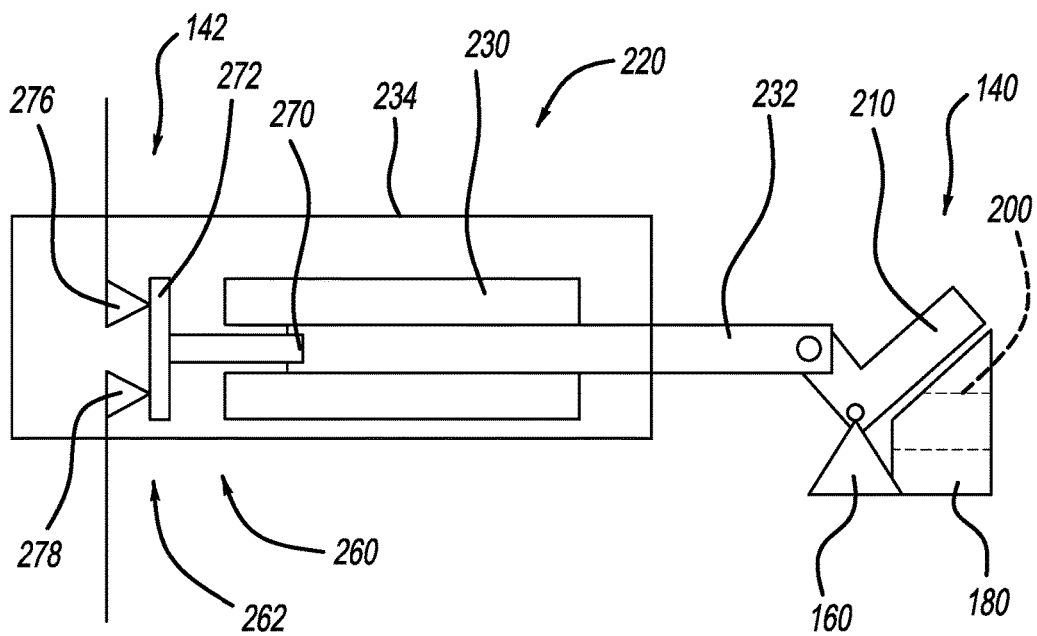
FIG. 6 is a schematic illustration of the park detect switch assembly of FIG. 4 out of the "Park" position.

The shifter system assembly 30 includes a BTSI system 220 that precludes an operator from moving the shift lever 34 out of a "Park" position unless the ignition switch 36 is in an "ON" position and a brake pedal is depressed. The BTSI system 220 includes a solenoid 230 that moves an armature or pin 232 between extended (FIGS. 3 and 5) and retracted (FIGS. 4 and 6) positions to selectively preclude and permit movement of the shift lever 34 out of "Park". The pin 232 defines an opening 240 that receives the second end 216 of the pawl 210. During operation, linear translation of the pin 232 causes rotatable motion of the pawl 210 about the pawl pin 166. For example, translation of the pin 232 rightward (as viewed from FIG. 3 to FIG. 4), causes clockwise rotation of the pawl 210 (as viewed from FIG. 3 to FIG. 4) about the pawl pin 166. Similarly, translation of the pin 232 leftward (as viewed from FIG. 4 to FIG. 3), causes anti-clockwise rotation of the pawl 210 (as viewed from FIG. 4 to FIG. 3) about the pawl pin 166. The pawl pin 166 can include a coating (e.g., a Polytetrafluoroethylene coating) to reduce wear. Additionally or alternatively, a lubrication can be used to reduce friction between the pawl pin 166 and the pawl 210.

The BTSI solenoid 230 is disposed in a BTSI solenoid housing 234. The BTSI solenoid housing 234, and therefore the BTSI solenoid 230 are located generally on a second end 236 of the stationary housing 154 proximate to the cam actuation lever 180. According to the present disclosure, the PDS 142 is integral to the BTSI system 220. The PDS 142 detects when the shifter mechanism, such as the shifter mechanism 104 described above, is in the "Park" position. The PDS 142 includes a first electrical contact portion 260 and a second electrical contact portion 262.

In the example shown, the first electrical contact portion 260 comprises an insulated pin extension portion 270 and conductive disc contact 272. The insulated pin extension portion 270 is fixed for translation with the pin 232. The second electrical contact portion 262 is fixed within the BTSI solenoid housing 234 and generally includes a key inhibit portion 276 and a ground 278. The electrical connection of the first and second electrical contact portions 260, 262 is dependent the mechanical movement of the pin 232. By making the electrical contact of the PDS 142 mechanically coupled to the BTSI solenoid 230, the actual position of the park lock assembly 140 will correspond to the key inhibit function of the PDS 142.

Operation of the park lock assembly 140 will be described. When the shifter mechanism 104 is in the "Park" position (FIG. 5), the solenoid 230 is de-energized so that the pawl 210 moves to an engaged position with the cam actuation lever 180. In the engaged position, the pawl 210 locates into the slot 200 of the cam actuation lever 180 in a locked position (see FIGS. 3 and 5). The pawl 210 therefore precludes rotation of the cam actuation lever 180 about the shaft 184. When the shifter mechanism 104 is not in the "Park" position (FIG. 6), the solenoid 230 is energized so that the pawl 210 moves to a disengaged position with the cam actuation lever 180. In the disengaged position, the pawl 210 moves out of the slot 200 of the cam actuation lever 180 in an unlocked position (see FIGS. 4 and 6). In the unlocked position, the pawl 210 does not inhibit rotation of the cam actuation lever 180 about the shaft 184. It will be appreciated that while the structural representation of the park lock assembly 140 discussed herein includes a pawl that locates into a slot, other configurations are contemplated for attaining a mechanical interlock between the pin 232 and the cam actuation lever 180. For example, the cam actuation lever 180 can alternatively define an aperture that selectively receives a member that moves as a result of translation of the pin 232. In other arrangements, the pin 232 can directly interface the cam actuation lever 180 (such as at the slot 200, an aperture, an extension or other feature). Other configurations may be used.

Operation of the PDS 142 will be described. When the shifter mechanism 104 is in the "Park" position, the solenoid 230 is de-energized so that the PDS 142 is open (FIG. 5) and the key can be removed from the ignition switch 30. When the shifter mechanism 104 is not in the "Park" position, the solenoid 230 is energized so that the PDS 142 is closed (FIG. 6) and the key cannot be removed from the ignition switch 30. In this regard, when the shifter mechanism 104 is in the "Park" position, the park lock assembly 140 is in the locked position and the PDS 142 is in the closed position. Similarly, when the shifter mechanism 104 is not in the "Park" position, the park lock assembly 140 is in the unlocked position and the PDS 142 is in the open position. It will be appreciated that the BTSI system 220 can be configured such that the solenoid can be de-energized in the "Park" position and energized when not in the "Park" position.

Figure 7A:
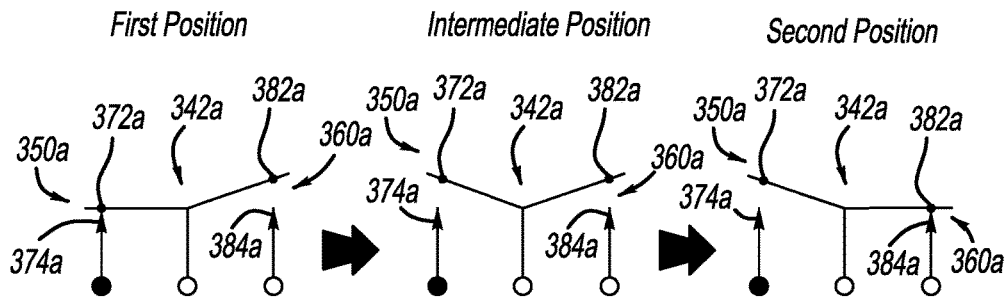
FIG. 7A is a schematic sequence illustration of a park detect switch constructed as a break before make switch in accordance to another example of the present disclosure.
Figure 7B:
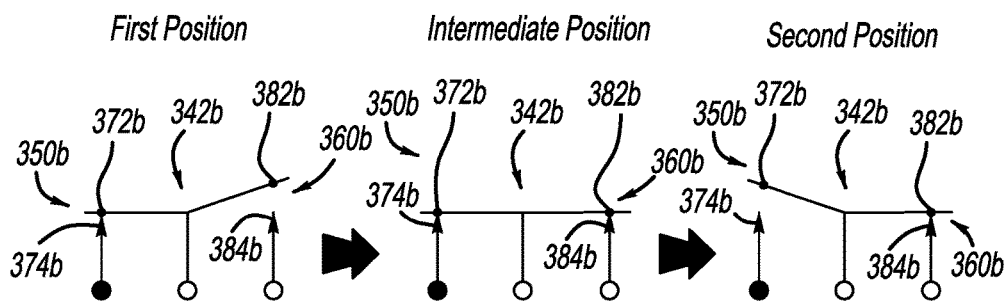
FIG. 7B is a schematic sequence illustration of a park detect switch constructed as a make before break switch in accordance to another example of the present disclosure.

According to the present disclosure, the PDS may take other forms. For example, the PDS may be a dual contact switch. A PDS 342a and a PDS 342b constructed in accordance to other examples are shown in FIGS. 7A and 7B. Either of the PDS 342a and 342b can be used in conjunction with the BTSI system 220 described above. The PDS 342a and 342b can be configured as a dual contact switch that includes a park confirmation contact assembly 350a, 350b and a key removal contact assembly 360a, 360b. The park confirmation contact assembly 350a, 350b can include a first park confirmation contact 372a, 372b and a second park confirmation contact 374a, 374b. The key removal contact assembly 360a, 360b can include a first key removal contact 382a, 382b and a second key removal contact 384a, 384b.

When the first park confirmation contact 372a, 272b engages the second park confirmation contact 374a, 374b ("First Position" or first connection), a first signal is produced indicating that the vehicle is in the "Park" position. Similarly, when the first key removal contact 382*a*, 382*b* engages the second key removal contact 384*a*, 384*b* ("Second Position" or second connection) a second signal is produced allowing removal of the key from the ignition switch 36.

The PDS 342*a* can be configured as a break before make switch. In a break before make switch, one of the first and second connections is broken (opened, see Intermediate Position FIG. 7A) before the other of the first and second connections is made (closed). The PDS 342*b* can be configured as a make before break switch. In a make before break switch, one of the first or second connections is made before the other of the first and second connections breaks (see Intermediate Position, FIG. 7B). Preferably, the first connection must occur before the second connection in order to authorize removal of the key from the ignition switch 36.

Figure 8:
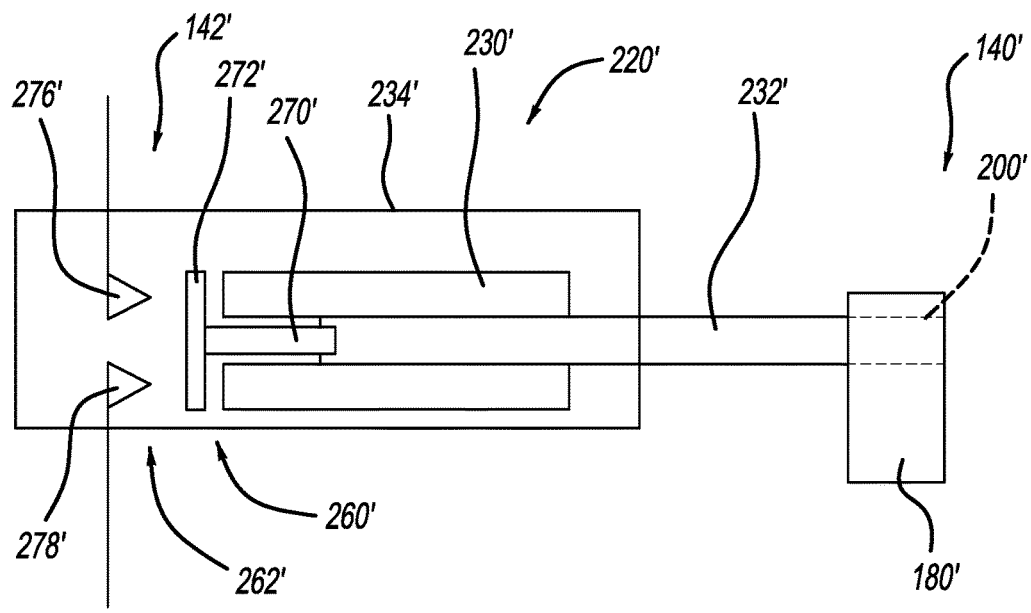
FIG. 8 is a schematic illustration of a park detect switch assembly constructed in accordance to another example and shown in the "Park" position.
Figure 9:
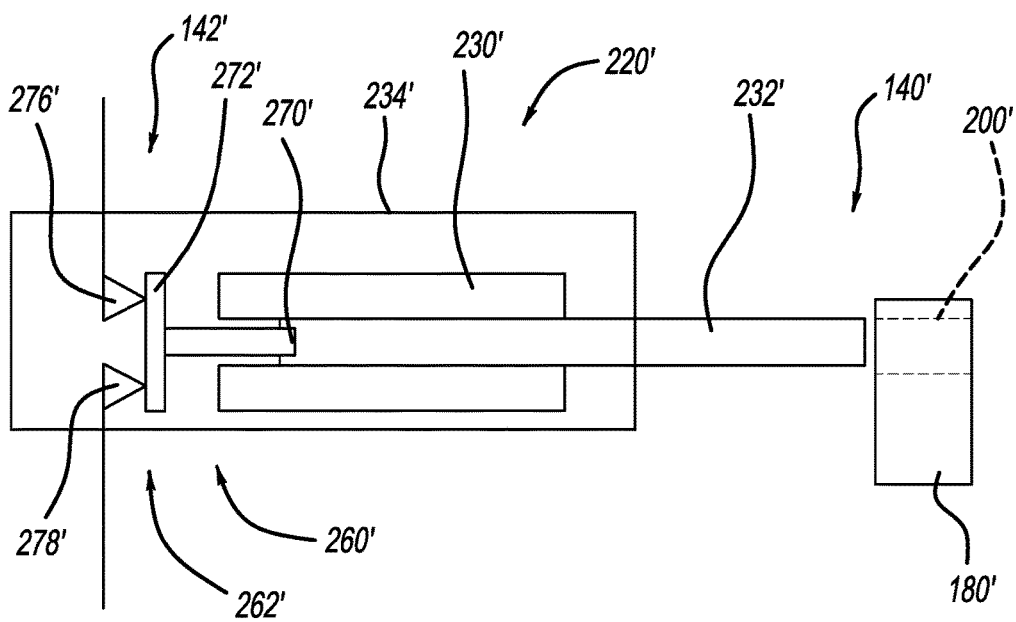
FIG. 9 is a schematic illustration of the park detect switch assembly of FIG. 8 out of the "Park" position.

Turning now to FIGS. 8 and 9, a BTSI system 220' constructed in accordance to another example of the present disclosure is shown. Unless described otherwise herein, the BTSI system 220' includes similar features as the BTSI system 220 described above but are illustrated in the FIGS. as having a "prime" suffix. In the BTSI system 220', the park lock assembly 140' includes a pin 232' locates directly into a slot 200' on the cam actuation lever 180'. The solenoid 230' moves the pin 232' between extended (FIG. 8) and retracted (FIG. 9) positions to selectively preclude and permit movement of the shift lever 34 out of "Park".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. In this regard, the ordering of method steps is not necessarily fixed, but may be capable of being modified without departing from the instant teachings. Such variations are not to be regarded as a departure from the disclosure, and all such modifications are intended to be included within the scope of the disclosure.

What is claimed is:

1. A shifter system assembly for a steering column, the shifter system assembly comprising:
    a shifter mechanism that receives a shift lever, the shifter mechanism having a shaft that rotates upon movement of the shift lever;
    a cam assembly having a cam actuator lever and a cam receiver, the cam actuator lever defining a first engagement feature and configured to rotate upon rotation of the shaft;
    a solenoid that moves a pin between an extended and retracted position based on the shifter mechanism being in a "Park" position or out of the "Park" position;
    a park lock assembly that moves between:
        (i) a locked position wherein the pin locates into an engaged position with the first engagement feature and precludes rotation of the cam actuator lever; and
        (ii) an unlocked position wherein the pin locates into a disengaged position relative to the first engagement feature permitting rotation of the cam actuator lever; and
    a park detect switch having a first state corresponding to the shifter mechanism being in the "Park" position and a second state corresponding to the shifter mechanism being out of the "Park" position, wherein in the first state, a key is permitted to be removed from an ignition switch and wherein in the second state, the key is precluded from being removed from the ignition switch, wherein the park detect switch includes a first electrical contact portion and a second electrical contact portion, wherein the first electrical portion comprises an insulated pin extension portion and a conductive disc contact, the insulated pin extension portion being fixed for translation with the pin.

2. The shifter system of claim 1 wherein switching between the first state and the second state is dependent upon movement of the pin between the extended and retracted positions.

3. The shifter system of claim 2 wherein the first state is an open state and the second state is a closed state.

4. The shifter system of claim 3 wherein the first and second electrical contact portions electrically contact each other in the closed state.

5. The shifter system of claim 1 wherein the first engagement feature is a slot defined in the cam actuation lever.

6. The shifter system of claim 5, further comprising a solenoid housing that houses the solenoid, the solenoid housing located at the lever end of the stationary housing proximate to the cam actuating lever.

7. A shifter system assembly for a steering column, the shifter system assembly comprising:
    a shifter mechanism that receives a shift lever, the shifter mechanism having a shaft that rotates upon movement of the shift lever;
    a cam assembly having a cam actuator lever and a cam receiver, the cam actuator lever defining a first engagement feature and configured to rotate upon rotation of the shaft;
    a solenoid that moves a pin between an extended and retracted position based on the shifter mechanism being in a "Park" position or out of the "Park" position;
    a park lock assembly that moves between:
        (i) a locked position wherein the pin locates into an engaged position with the first engagement feature and precludes rotation of the cam actuator lever; and
        (ii) an unlocked position wherein the pin locates into a disengaged position relative to the first engagement feature permitting rotation of the cam actuator lever; and
    a dual contact park detect switch having:
        (i) a park confirmation contact assembly having first and second park confirmation contacts that move between open and closed positions, the closed position defining a first connection; and
        (ii) a key removal contact assembly having first and second key removal contacts that move between open and closed positions, the closed position defining a second connection;
    wherein the dual contact park detect switch is one of a break before make switch and a make before break switch, wherein a key is permitted to be removed from an ignition subsequent to sequential closing of the first and second connections.

8. A shifter system assembly for a steering column, the shifter system assembly comprising:
    a stationary housing;
    a shifter mechanism rotatably coupled to the stationary housing and that receives a shift lever, the shifter mechanism having a shaft that rotates within the stationary housing upon movement of the shift lever;

a cam actuator lever disposed on a lever end of the stationary housing for concurrent rotation with the shaft, the cam actuation lever defining a first engagement feature comprising a slot;

a solenoid housing disposed at the lever end of the stationary housing;

a solenoid received in the solenoid housing that moves a pin between an extended and retracted position based on the shifter mechanism being in a "Park" position or out of the "Park" position; and a park lock assembly including a second engagement feature that moves based on movement of the pin, the second engagement feature comprising a pawl that selectively locates into the slot, the park lock assembly moving between:

(i) a locked position wherein the second engagement feature locates into an engaged position with the first engagement feature and precludes rotation of the cam actuator lever; and (ii) an unlocked position wherein the second engagement feature locates into a disengaged position relative to the first engagement feature permitting rotation of the cam actuator lever.

9. The shifter system of claim 8, further comprising a park detect switch having an first state corresponding to the shifter mechanism being in the "Park" position and a second state corresponding to the shifter mechanism being out of the "Park" position, wherein in the first state, a key is permitted to be removed from an ignition switch and wherein in the second state, the key is precluded from being removed from the ignition switch.

10. The shifter system of claim 9 wherein switching between the first state and the second state is dependent upon movement of the pin between the extended and retracted positions.

11. The shifter system of claim 10 wherein the first state is an open state and the second state is a closed state.

12. The shifter system of claim 11 wherein the park detect switch includes a first electrical contact portion and a second electrical contact portion, the first and second electrical contact portions electrically contacting each other in the closed state.

13. The shifter system of claim 12 wherein the first electrical portion comprises an insulated pin extension portion and a conductive disc contact, the insulated pin extension portion being fixed for translation with the pin.

14. The shifter system of claim 8 wherein the pawl includes a pawl body having a first end and a second end that extend relative to each other substantially at an angle between 80° and 110°.

15. The shifter system of claim 14 wherein the pawl is pivotally coupled to a stationary housing that is fixed relative to the steering column, the stationary housing having a lever end that includes the cam actuator lever.

16. The shifter system of claim 8, further comprising a dual contact park detect switch having:

(i) a park confirmation contact assembly having first and second park confirmation contacts that move between open and closed positions, the closed position defining a first connection; and (ii) a key removal contact assembly having first and second key removal contacts that move between open and closed positions, the closed position defining a second connection;

wherein the dual contact park detect switch is one of a break before make switch and a make before break switch, wherein a key is permitted to be removed from an ignition subsequent to sequential closing of the first and second connections.

17. The shifter system of claim 7 wherein the first engagement feature is a slot defined in the cam actuation lever.

18. The shifter system of claim 17, further comprising a solenoid housing that houses the solenoid, the solenoid housing located at the lever end of the stationary housing proximate to the cam actuating lever.

* * * * *